United States Patent [19]

Ito

[11] 3,938,185
[45] Feb. 10, 1976

[54] CASSETTE TAPE DATA PROCESSING TERMINAL UNIT WITH LATCH

[75] Inventor: Youichi Ito, Osaka, Japan

[73] Assignee: Sharp Kabushiki Kaisha, Osaka, Japan

[22] Filed: June 28, 1974

[21] Appl. No.: 484,344

[30] Foreign Application Priority Data
June 29, 1973  Japan.............................. 48-74058

[52] U.S. Cl. ........................ 360/69; 360/4; 360/137
[51] Int. Cl. ...................... G11b 15/04; G11b 15/10
[58] Field of Search ..................... 360/4, 60, 93–96, 360/69

[56] References Cited
UNITED STATES PATENTS

| 3,413,624 | 11/1968 | Murdoch | 360/4 |
| 3,609,844 | 10/1971 | Ichikawa | 360/96 |
| 3,684,208 | 8/1972 | Larsen | 360/96 |
| 3,758,119 | 9/1973 | Harlan | 360/96 |
| 3,758,121 | 9/1973 | Walsh | 360/96 |
| 3,766,327 | 10/1973 | Johnson | 360/96 |
| 3,832,733 | 8/1974 | Eldridge | 360/4 |

*Primary Examiner*—James W. Moffitt
*Assistant Examiner*—Jay P. Lucas
*Attorney, Agent, or Firm*—Stewart and Kolasch, Ltd.

[57] ABSTRACT

The data processing terminal unit in the form of a point of sale transaction device disclosed herein contains a cassette tape deck which includes a cassette type magnetic tape for data manipulation and a cassette tape loading member for allowing the entry and withdrawal of the cassette tape in addition to a cassette tape recording scheme. There is provided a deck state sensing arrangement which detects open and closed states of the tape loading member, a tape loading state, the positions of various records included in the cassette tape and so forth. The tape loading member is opened to allow the withdrawal of the cassette tape loaded within the tape recording scheme only after writing end markings into the cassette tape.

5 Claims, 7 Drawing Figures

CASSETTE TAPE DATA PROCESSING TERMINAL UNIT WITH LATCH

This invention relates to an improvement on a data processing terminal unit containing a cassette type magnetic tape therein.

In the past, there have been developed data transaction or manipulation systems of the type wherein data entries occurring at a point of sale terminal such as utilized in a retail sales store are recorded on a cassette type magnetic tape which, in turn, is coupled with a central data processing computer system through a medium converter such as a tape to tape converter. When it is desired to record data entries on the cassette tape, predetermined markings such as tape marks and end marks should be written at the beginning points and ending points of individual record fields of the cassette tape. In the event that the operator fails to enter such markings into the cassette tape, this will result in trouble in handing data received from the date processing terminal unit.

The object of the invention is to provide an improvement on a data processing terminal unit which can overcome the shortcomings of the prior art system discussed above.

The above and further objects, features and advantages of the invention will become more apparent in the following detailed description of the invention with reference to accompanying drawings, in which.

Figure 1:
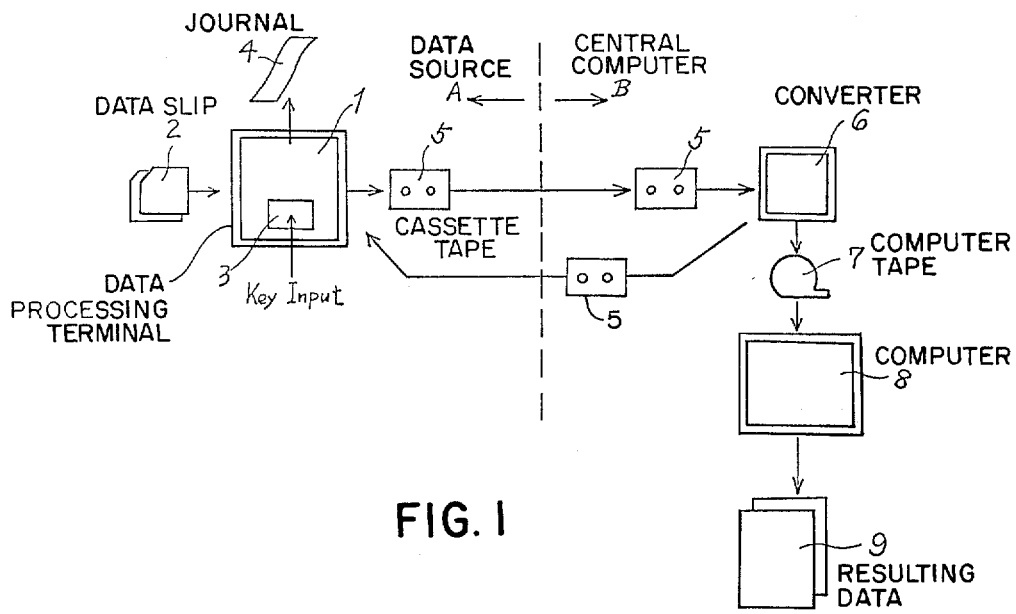
FIG. 1 is a schematic block diagram of a data processing system employing a cassette tape.

Referring now to FIG. 1 there 1, illustrated a data processing system utilizing a cassette type magnetic tape which is useful for handing a large number of slip data contained in, for example, deliver slips and transfer slips. That is, data included on a slip 2 are introduced by means of a keyboard 3 and so on into a data processing terminal unit 1 located at a data source A such as a retail sales store or a branch office, and then are printed on a journal 4 and recorded on a cassette type magnetic tape 5 in the form of digital signals.

Thereafter, the cassette tape 5 carrying the transaction data thereon is sent to a central computer system center B positioned at a central office. The transaction data is rewritten through a converter 6 into an appropriate record medium accessible to computers, for example, a ½ inch magnetic tape 7 which is coupled with a computer 8 for handling data and performing arithmetic and statistic operations to provide various resulting data 9.

Figure 2:
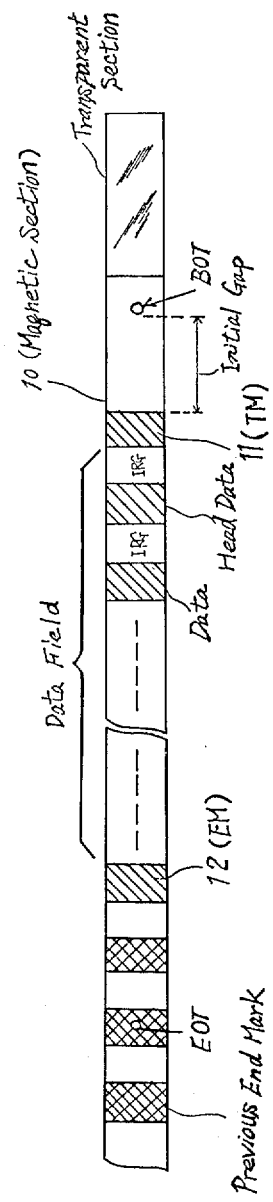
FIG. 2 is a format diagram of data and control markings recorded on the cassette tape.

In such a system, after the cassette tape 5 is loaded into the tape converter 6 which in turn is coupled with the computer 8, the cassette tape 5 is returned to the data source A in order to accept new data through the data processing terminal unit 1. As illustrated in FIG. 2, the cassette tape 5 is composed of a magnetic section 10 and a transparent section 50 and, within the magnetic section 10, a control block known as tape markings (TM signal) 11 which consists of a preamble, two bytes of eight ZERO bits each and a postamble, should be written just after a beginning-of-tape (BOT) hole or slot. Thus, the data may be recorded on a data field following the beginning-of-tape hole. Furthermore, it is necessary that end markings (EM signal) 12 be written upon completion of data entry. This is because the conventional tape converter 6 is adapted to read out only the data interposed between the TM signal 11 and the EM signal 12.

However, in the event that the operator fails to introduce the marking signals set forth above into the cassette tape 5 and the cassette tape 5 containing no marking signals is sent to the computer center, the tape converter 6 will misread the previous data because of the absence of the marking signals and more specifically EM signals.

In view of the foregoing shortcomings, the data processing terminal unit in accordance with the present invention is designed to prevent the operator from failing to write the marking signals into the cassette tape 5.

Figure 3:
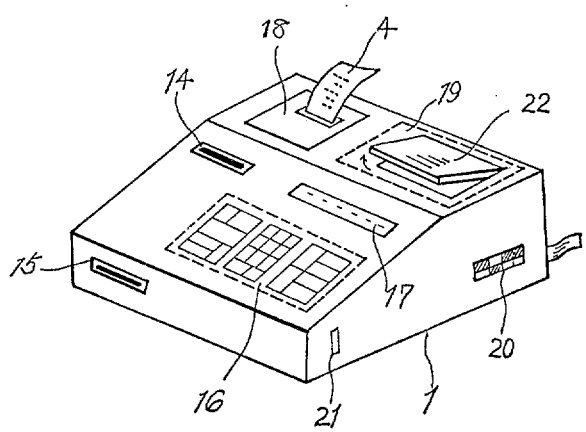
FIG. 3 is a perspective view of a data processing terminal unit wherein the present invention may be embodied.

FIG. 3 illustrates a preferred form of the data processing terminal unit used with the invention, wherein the reference number 14 represents a card inlet which is utilized when slip data are inputted through a card, while the reference number 15 represents a card outlet. A keyboard 16 includes a set of mannually operable digit keys and a set of function keys such as register, verify, correct, cancel and clear keys. The terminal unit 1 is further provided with a visual display panel 17, a printing unit 18, a cassette tape recording deck 19, a select switch 20 and a power switch 21. It is of importance for the invention that the cassette deck 19 within the data processing terminal unit includes a control mechanism for a cassette holder 22 and a variety of detectors for the purpose of preventing operator's failure to accurately operate and handle the cassette tape 5 prior to the loading of the cassette tape 5 to the computer system, as illustrated in FIG. 4 showing a closed state of the cassette tape holder 22 and FIG. 5 showing an open state of the same.

Figure 4:
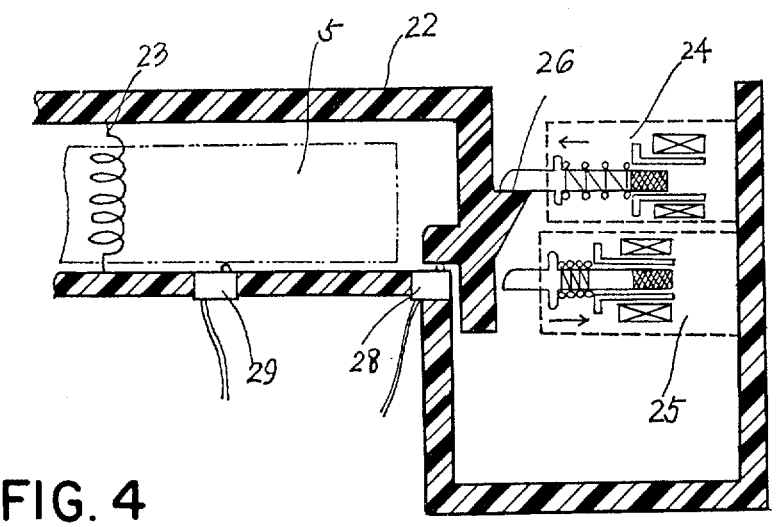
FIGS. 4 and 5 are partially-enlarged sectional views of a tape loading mechanism employed in the data processing terminal unit of FIG. 3 in accordance with the present invention.
Figure 5:
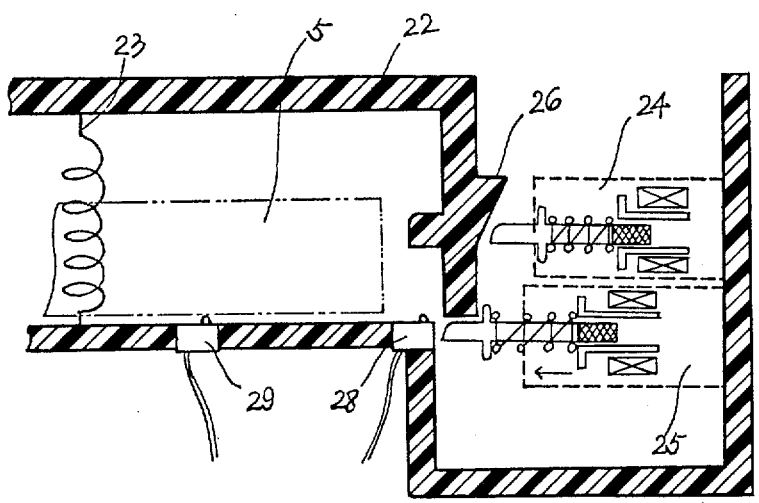

Referring in detail to FIGS. 4 and 5, the spring tension of a spring 23 acts on the cassette tape holder or cover 22 in a direction tending to open the holder 22. A pair of plungers 24, 25 is provided one 24 of which will pull its lever into a solenoid and permit the cassette tape holder 22 to assume an open state in response to solenoid current caused by the writing of the above described EM signals 12 into the cassette tape upon completion of data registration, and the other 25 of which will pull its lever into a solenoid and permit the cassette tape holder 22 to assume closed state in response to solenoid current caused by turning on the power switch 21. With such an arrangement, unless the writing of the EM signals is executed on the cassette tape 5 by an EM key included within the keyboard 16, the operator cannot take the cassette tape from the cassette recording station since a locking up projection 26 is arrested by the lever of the first plunger mechanism 24.

A first detector switch 28 is provided for determining whether the cassette tape holder 22 is in the open and closed states and a second detector switch 29 determines whether the cassette tape 5 is loaded on the cassette recording station. Furthermore, a tape position detector (not illustrated) is positioned adjacent to a magnetic head for optically detecting either the magnetic section (record field) or the transparent section (leader portion).

The mode of operation of the data processing terminal unit in response to signals from the various detectors will be described below.

First of all, when the cassette tape 5 is loaded and the power switch 21 is on, the second plunger means 24 is energized to enable the opening of the cassette tape holder or cover 22. At this time, the leader portion of the cassette tape 5 does not reach the position of the magnetic head. However, when the same reaches the magnetic head, the first plunger means 24 is also energized in response to outputs of the tape position detector such that the cassette tape holder 22 carrying the cassette tape 5 is opened thereby to inhibit registration or recording of key signals from the keyboard 16 on the cassette tape 5. Therefore, this avoids the possibility that new data are misswritten within the data field containing the previous data.

If the cassette tape 5 is loaded on the precise position and the holder 22 is in the closed state, the inhibition of key entry will be released or canceled to enable only registration of the TM signals and head data such as date, etc. Under the circumstances, the tape starts to travel upon mannual depression of the TM key in the keyboard 16 and determinations for both the magnetic section 10 and the BOT hole are carried out. The TM signals 11 are written with the preceding initial gap and then the head data are written on the cassette tape 5 with an interblock gap therebetween. Thereafter, the slip data are entered on the cassette tape 5 via the card, the keyboard, etc. to perform data entry registration.

Even when power supply is interrupted in these conditions, no current flows through the first plunger means 24 such that its lever is in the protruded state due to spring bias and the cassette tape holder remains in the closed state, thereby inhibiting the withdrawal of the cassette tape 5. When the power switch 21 is again thrown, if the magnetic section of the cassette tape is at the position of the magnetic head, only the registering or recording of the key inputs concorned with data is allowed by virtue of the outputs from the detector switch 29 and the tape position detector.

Afterward, upon completion of the data registration or detection of an end-of-tape (EOT) hole or slot, only mannual depression of the EM key and hence the writing of the EM signals can energize the first plunger 24. Therefore, the cassette tape holder 22 will remain in the closed state unless the EM key is mannually operated. When the EM signals or end marking signals are registered on the cassette tape 5, the cassette tape holder 22 is opened or ejected to enable the removal of the cassette tape therefrom. Since the keys are operatively locked upon the ejection of the cassette tape holder 22 although not shown, new data entries will not follow.

Figure 6:
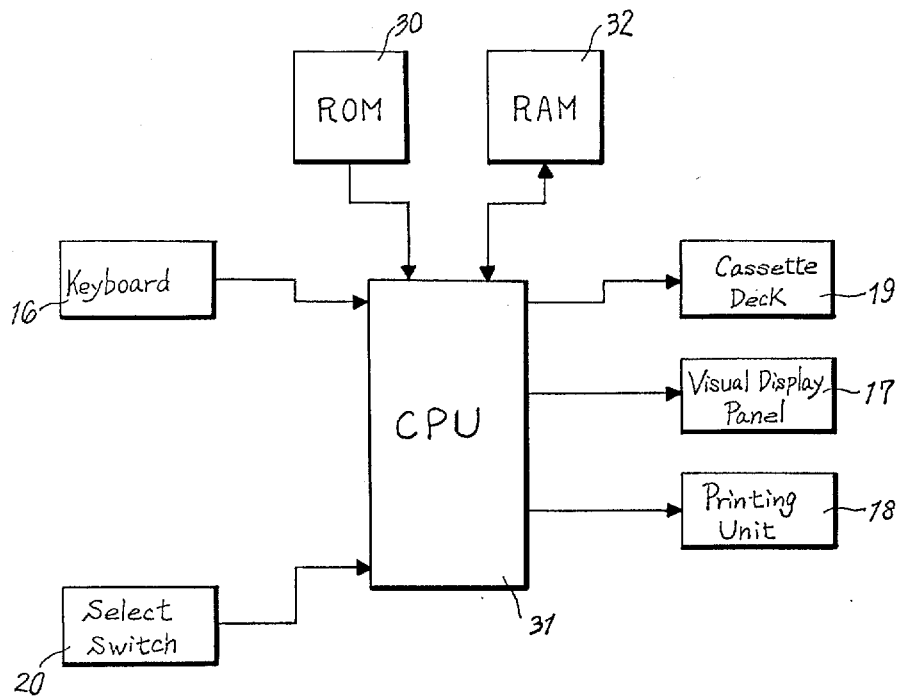
FIG. 6 is a schematic block diagram of circuit components of the data processing terminal unit.

The control functions discussed above are all accomplished by a control program included in a read-only memory (ROM) 30 and control signals derived from a central processing unit (CPU) 31 as illustrated in FIG. 6.

Figure 7:
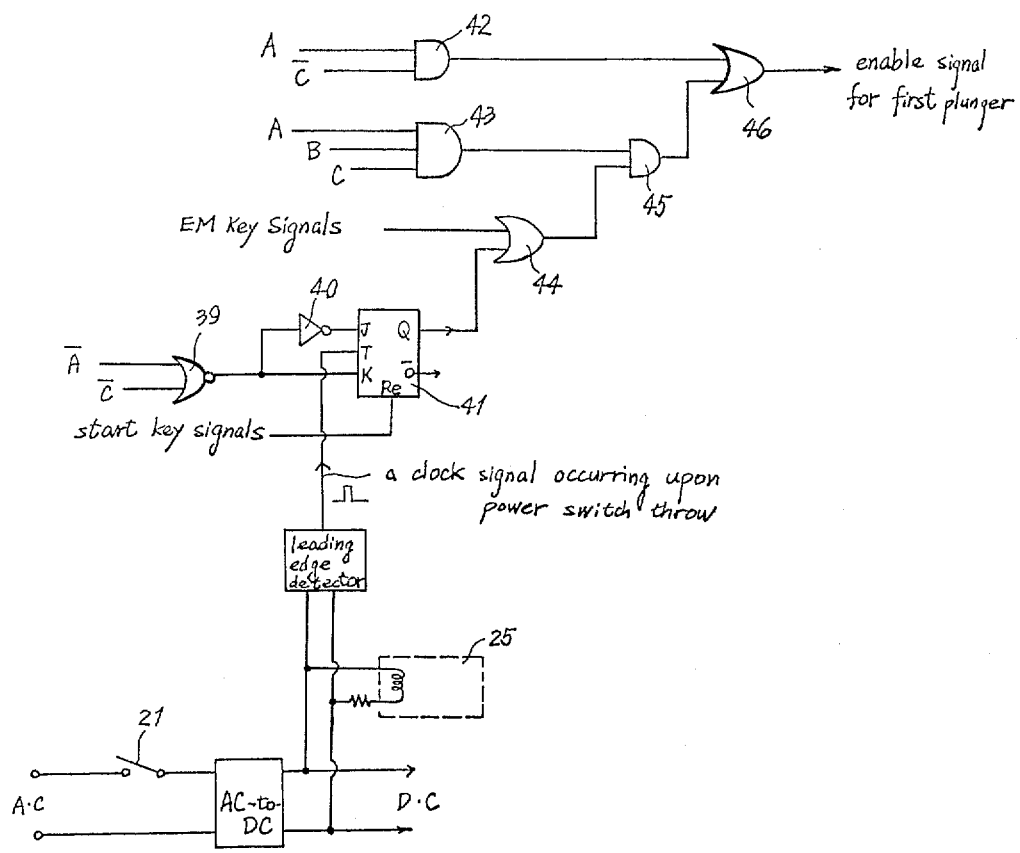
FIG. 7 is a schematic circuit diagram of a tape loading control circuit in the preferred form of the present invention.

As an alternative, these control functions may be realized by logical gating circuits as illustrated in FIG. 7, wherein the first signal A is the holder closed signal derived when the holder 22 is in the closed state and the switch 28 is also closed, the second signal B is the magnetic section detection signal derived when the magnetic section is sensed, and the third signal C is the cassette tape loaded signal derived when the cassette tape 5 is loaded and the switch 29 is closed. The set output Q of a flip-flop 41 indicates that the holder 22 is opened and the power switch 21 is on.

Briefly speaking, when the cassette tape 5 is not loaded under the holder closed state, outputs from an AND gate 42 activate the first plunger means 24 via an OR gate 46 thereby allowing the cassette tape holder 22 to be open. Also, when the magnetic section of the cassette tape 5 is sensed under the holder closed state, outputs from an AND gate 43 develops and manual depression of the EM key creates outputs of an OR gate 44. An AND gate 45, therefore, provides enable signals for the first plunger means 24 thereby opening the cassette tape holder 22 and ejecting the cassette tape 5 therefrom. The second plunger 25 is operative when a direct voltage is supplied through the power switch 21.

It is to be understood that the above-described embodiments are simply illustrative of the principles of the invention and that many embodiments may be devised without departing from the scope and spirit of the invention. The data processing system as illustrated in FIGS. 1 through 3 is disclosed and claimed in a copending application in the names of Hiroshi Inoue and Masanao Matsushima, entitled "Data Terminal Unit", Ser. No. 437,724 filed Jan. 30, 1974 and assigned to the present assignee.

What is claimed is:

1. A data processing terminal unit comprising:
   a cassette tape including a data field;
   recording means associated with said cassette tape for recording data thereon;
   data input means connected with said recording means for transmitting data therethrough to said cassette tape;
   said cassette tape including at least one data field;
   entry means in said data input means providing start and end marking signals to said recording means to effect start and end markings on said tape defining the beginning and end, respectively, of said data field; and
   housing means for releasably receiving said cassette tape, comprising:
   closure means for closing and opening said housing to contain or release said cassette tape therefrom,
   sensing means in said housing means detecting the presence and absence of a said cassette tape in said housing and the closed and open states of said closure means and providing state signals representative thereof,
   circuit means responsive to said state signals and said start and end marking signals to provide closure control signals in response to predetermined combinations of said state and marking signals, and
   latch means responsive to said closure control signals to selectively preclude opening and closing of said closure means.

2. A data processing terminal unit as set forth in claim 1, wherein, when said cassette tape is present in said housing and said closure means is in a closed state, said circuit means constrains said latch means to preclude opening of said closure means until said entry means provides said end marking signal.

3. A data processing terminal, unit as set forth in claim 1, wherein said sensing means comprises:
   first switch means for engaging said cassette means to indicate the presence or absence of said cassette means in said housing; and
   second switch means for engaging said cover means to indicate the closed or open state of said cover means.

4. A data processing terminal unit as set forth in claim 1, wherein said circuit means further includes;
   a power input switch for controlling the application of electric power to said circuit means and control means providing a latch control signal in response to closure of said power input switch; and
   wherein said latch means comprise first and second electrically operated latch bolts normally biased into proximity with said closure means to preclude, respectively, the opening and closing thereof;
   said second latch bolt being withdrawn from proximity with said closure means in response to said latch control signal to permit said closure means to assume a closed state.

5. A data processing terminal unit as set forth in claim 4, wherein said circuit means further includes second control means responsive to the concurrent presence of said cassette tape in said housing, said closed state of said housing and the existence of said end marking signal from said entry means to provide a second latch control signal;
   said first latch bolt being withdrawn from proximity with said closure means in response to said second latch control signal to permit said closure means to assume an open state.

* * * * *